United States Patent
Miki et al.

(10) Patent No.: US 7,433,276 B2
(45) Date of Patent: Oct. 7, 2008

(54) DOMAIN WALL DISPLACEMENT DETECTION SYSTEM MAGNETO-OPTICAL RECORDING MEDIUM AND ITS MANUFACTURING METHOD

(75) Inventors: Takeshi Miki, Tokyo (JP); Goro Fujita, Kanagawa (JP)

(73) Assignee: Sony Corporation (JP)

( * ) Notice: Subject to any disclaimer, the term of this patent is extended or adjusted under 35 U.S.C. 154(b) by 741 days.

(21) Appl. No.: 10/864,395

(22) Filed: Jun. 10, 2004

(65) Prior Publication Data
US 2004/0264306 A1   Dec. 30, 2004

(30) Foreign Application Priority Data
Jun. 25, 2003 (JP) ............................ P2003-181299

(51) Int. Cl.
*G11B 11/00* (2006.01)
(52) U.S. Cl. ................................ 369/13.54; 369/13.55
(58) Field of Classification Search ............. 369/13.47, 369/44.13, 13.01, 275.4, 13.55, 13.54
See application file for complete search history.

(56) References Cited

U.S. PATENT DOCUMENTS 6,128,273 A * 10/2000 Horie et al. ............... 369/275.4

(Continued)

FOREIGN PATENT DOCUMENTS

EP    1 408 494 A    4/2004

(Continued)

OTHER PUBLICATIONS

Miki, et al—XPO02462560 "Gbit/in<2> recording on a DWDD disc using a land/groove substrate with a red laser enabled by a side-wall annealing process" Database Inspect [Online] The Institute of Electrical Engineers, Stevenage—Sep. 16, 2003.

(Continued)

*Primary Examiner*—Tan X Dinh
(74) *Attorney, Agent, or Firm*—Rader Fishman & Grauer PLLC; Ronald P. Kananen (57) ABSTRACT

A domain wall displacement detection (DWDD) system magneto-optical recording medium forms a land 3 and a groove 4 as signal recording areas. When a domain wall displacement improvement is changed by irradiating annealing light La on a boundary wall surface 5 between the land 3 and the groove 4, the position of this annealing light is detected by an annealing light scanning position displacement detecting wobbling portion 7 formed at a portion extending along the recording track length direction of the boundary wall surface 5. The annealing light scans this wobbling portion 7, whereby a vibration amplitude of a cycle corresponding to the cycle of the wobbling portion 7 is produced to thereby detect and monitor the miniscule change of the scanning position of the annealing light with high sensitivity. Thus, in the DWDD system magneto-optical recording medium, the scanning position of the annealing light at the boundary wall surface between the land 3 and the groove 4 can be detected with high sensitivity.

5 Claims, 6 Drawing Sheets

U.S. PATENT DOCUMENTS

| | | |
|---|---|---|
| 6,265,062 B1 * | 7/2001 | Shiratori .................. 428/332 |
| 6,716,489 B2 * | 4/2004 | Miyaoka .................. 427/548 |
| 7,313,055 B2 * | 12/2007 | Hiroki .................. 369/13.08 |
| 2002/0058120 A1 | 5/2002 | Uchida et al. |
| 2003/0202430 A1 * | 10/2003 | Nishikawa .................. 369/13.47 |

FOREIGN PATENT DOCUMENTS

| | | |
|---|---|---|
| JP | 08-147777 | 6/1996 |
| JP | 2002-319198 | 10/2002 |
| JP | 2002-319201 | 10/2002 |
| WO | WO-01/93259 A1 | 12/2001 |

OTHER PUBLICATIONS

Miki et al—XPO02462559—"15 Gbit/in<2> recording on a DWDD disc using a land/groove substrate with a red laser enabled by a side-wall annealing process" Proceedings of the SPIE- the International Society for Optical Ingineering SPIE-INT-SOC> Opt. ENF USA, vol. 5069, No. 1 Sep. 16, 2003.

* cited by examiner

Position in Recording Track Direction (Time)

DOMAIN WALL DISPLACEMENT DETECTION SYSTEM MAGNETO-OPTICAL RECORDING MEDIUM AND ITS MANUFACTURING METHOD

BACKGROUND OF THE INVENTION

1. Field of the Invention

The present invention relates generally to a magneto-optical recording medium, and more particularly to a domain wall displacement detection (DWDD) system magneto-optical recording medium in which a magneto-optical recording arrangement film is formed on a substrate having a land and a groove, both of the land and the groove are used as signal recording areas and which uses a reproduction system based upon a DWDD system and a method of manufacturing such DWDD system magneto-optical recording medium.

2. Description of the Related Art

Of magneto-optical recording mediums, in particular, a DWDD (domain wall displacement detection) system magneto-optical recording medium is able to attain high-density recording, and therefore it is regarded as an important magneto-optical recording medium.

A reproduction system of this DWDD system magneto-optical recording medium is based upon a system in which a magnetic recording mark is enlarged in size by a temperature distribution produced with irradiation of reproducing laser light on the magneto-optical recording medium, the thus enlarged recording mark being read out from the magneto-optical recording medium. According to this arrangement, the recording mark is microminiaturized up to the size smaller than an optical diffraction limit of the reproducing light, whereby a linear recording density can be increased to attain a large recording capacity.

In the case of the DWDD system magneto-optical recording medium, in order to improve jitters and bit error rates, it becomes necessary to realize a smooth displacement of a domain wall.

As a method of smoothly displacing a domain wall, there have been proposed methods in which a magnetic layer between the tracks is changed as an in-plane magnetic film or a non-magnetic film by annealing the magnetic layer in order to avoid a magnetic field generated from the adjacent recording track from affecting the smooth displacement of the domain wall (see cited patent references 1 and 2, for example).

In the above-mentioned DWDD system magneto-optical recording medium, in order to increase a recording capacity much more, it is requested that the recording system thereof should be based upon a so-called land and groove recording system in which both of the land and the groove are used as the recording areas. In that case, it is necessary that the domain wall should be displaced smoothly both with respect to the recording areas of the lands and the grooves.

Figure 1:
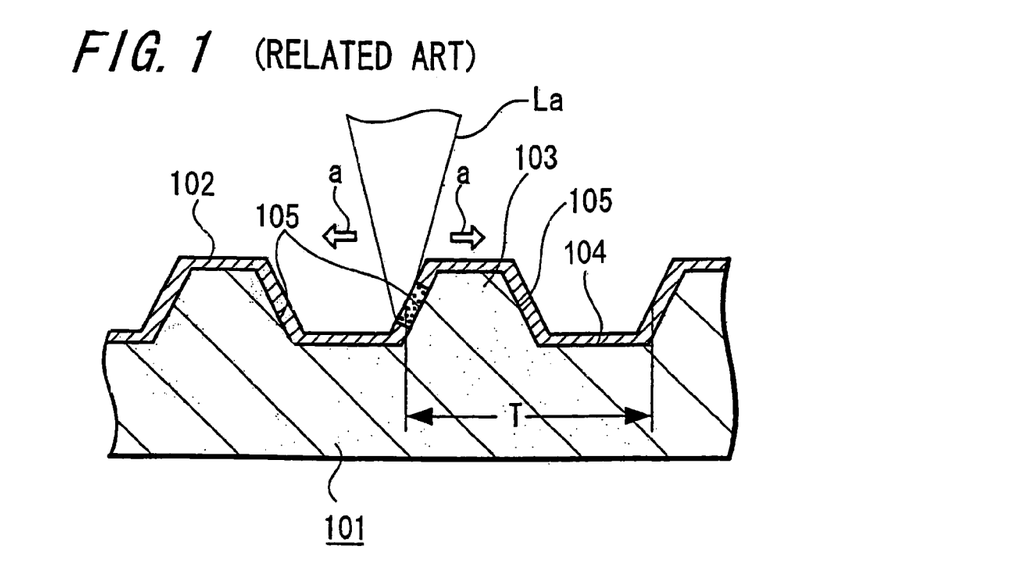
FIG. 1 is a schematic cross-sectional view of a magneto-optical recording medium according to the related art and to which reference will be made in explaining the manner in which annealing light is irradiated at substantially the center of a boundary wall surface.

Accordingly, in this land and groove recording system, in order to enable the domain wall to be displaced satisfactorily with respect to the two recording areas, as shown in FIG. 1, a magneto-optical recording arrangement film 102 formed on a recording medium substrate 101 is annealed by irradiating annealing light La on substantially the center, for example, of a boundary wall surface 105 between a land 103 and a groove 104 formed on the substrate 101.

Figure 2:
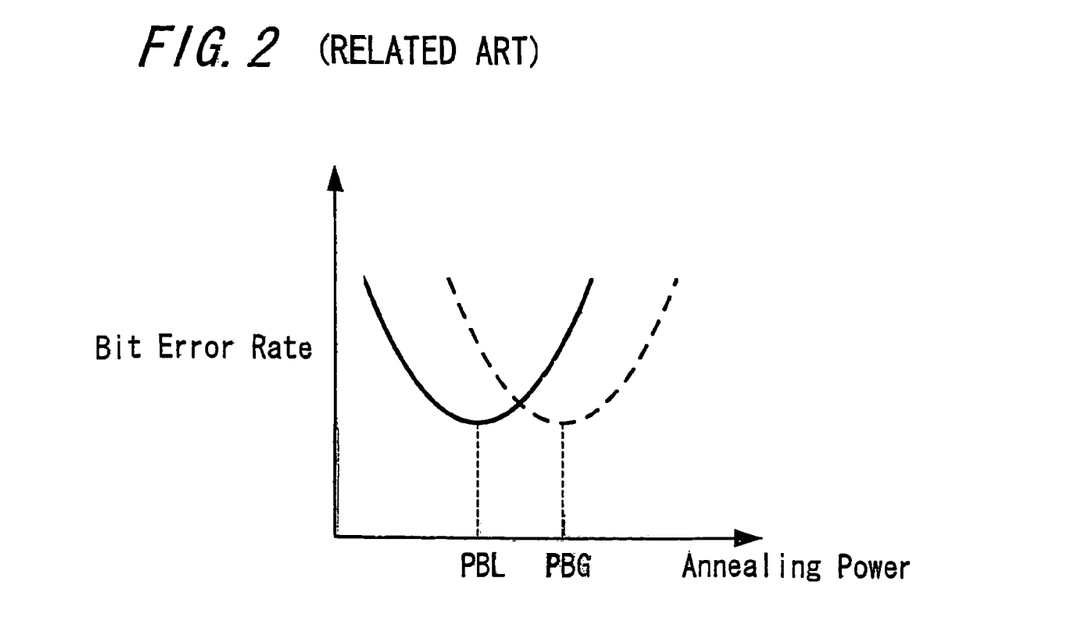
FIG. 2 is a diagram showing a relationship between annealing powers and bit error rates according to the related art.

In this case, when the annealing light La moves toward the side of the groove 104 or toward the side of the land 103 as shown by an arrow a in FIG. 1, as shown by a solid line curve and a broken line curve which show relationships between annealing powers in the respective recording areas of the land 103 and the groove 104 and bit error rates obtained after the annealing treatment in contrast in FIG. 2, optimum annealing powers PBL and PBG which show minimum bit error rates in the land 103 and the groove 104 become different from each other. That is, the annealing power margins that can reduce the bit error rate at the same time are narrowed both in the land 103 and the groove 104.

The thus obtained magneto-optical recording medium causes land and groove recording and reproducing characteristic to differ from each other, and hence a problem arises, in which the recording power margins also cannot be increased sufficiently.

It is not always desired that the annealing position should be selected at the center of the boundary wall surface due to various reasons such as characteristics, shapes and dimensions of the magneto-optical recording arrangement film in the land and the groove. In addition, it is frequently observed that the optimum annealing position should be selected at every manufacturing lot, for example.

In order to improve the jitter and the bit error rates equally both in the recording areas of the land and the groove as described above, it becomes necessary that annealing light should irradiate at optimum positions between upper and lower edge portions of the boundary wall surface along the recording track length direction over the whole of the recording tracks.

Then, as a method for irradiating annealing light at the predetermined position, there is considered a tracking servo method based upon a so-called three-beam push-pull detection method that is applied to an optical pickup for use with ordinary optical recording mediums.

However, according to this method, as will become clear from the descriptions which will be made later on, a problem arises, in which sensitivity at which the position of the annealing light on the boundary wall surface should be detected is low.

[Cited Patent Reference 1]
Japanese laid-open patent application No. 8-147777, paragraph number [0010]

[Cited Patent Reference 2]
Japanese laid-open patent application No. 2002-319198, paragraph numbers [0010], [0011]

SUMMARY OF THE INVENTION

In view of the aforesaid aspect, it is an object of the present invention to provide a domain wall displacement detection (DWDD) system magneto-optical recording medium in which position at which annealing light scans a boundary wall surface of a land and a groove can be detected with high sensitivity so that a jitter and an error rate can be decreased both in the land and the groove by the same annealing treatment.

It is another object of the present invention to provide a method of manufacturing the above-mentioned DWDD system magneto-optical recording medium.

According to an aspect of the present invention, there is provided a domain wall displacement detection system magneto-optical recording medium in which a magneto-optical recording arrangement film is formed on a disc substrate including a land and a groove, the land and groove are both formed as signal recording areas, a signal is recorded and reproduced based upon a domain wall displacement detection system and in which a boundary wall surface between the land and the groove is formed as a changed portion for improving domain wall displacement by irradiating the boundary wall surface between the land and the groove with annealing light along the recording track length direction. This domain wall displacement detection system magneto-optical recording medium is comprised of a wobbling portion that wobbles in the width direction of the recording track for detecting a displacement of annealing light scanning position formed at one portion along the recording track length direction of the boundary wall surface.

In accordance with another aspect of the present invention, there is provided a method of manufacturing a domain wall displacement detection system magneto-optical recording medium in which a magneto-optical recording arrangement film is formed on a disc substrate including a land and a groove, the land and groove are both formed as signal recording areas, a signal is recorded and reproduced based upon a domain wall displacement detection system and in which a boundary wall surface between the land and the groove is formed as a changed portion for improving domain wall displacement by irradiating the boundary wall surface between the land and the groove with annealing light along the recording track length direction. This method is comprised of the steps of preparing a disc substrate in which a wobbling portion that wobbles in the width direction of the recording track for detecting a displacement of annealing light scanning position is formed at one portion along the recording track length direction of the boundary wall surface and on which the magneto-optical recording arrangement film is deposited, an annealing light scanning and irradiating process in which annealing light is irradiated on the boundary wall surface between the land and the groove to change the magneto-optical recording arrangement film at the irradiated portion and detecting the irradiated position of the annealing light by detecting returned light of the annealing light in the annealing light scanning and irradiating process and causing a vibration amplitude of a cycle corresponding to a cycle of the wobbling portion to occur in the position detection signal by the wobbling portion.

As described above, according to the domain wall displacement detection system magneto-optical recording medium of the present invention, the magneto-optical recording arrangement film is changed as a non-magnetic or in-plane magnetization film at substantially a central high temperature heated portion of the annealing light with irradiating annealing light on the boundary wall surface between the land and the groove, whereby the domain wall can be displaced satisfactorily. According to this magneto-optical recording medium, since the wobbling portion is formed on the boundary wall surface, the annealing light scans the boundary wall surface across the concavities and convexities of this wobbling portion to increase the amplitude of the detection signal at the scanning position, thereby resulting in detection sensitivity being increased.

DESCRIPTION OF THE PREFERRED EMBODIMENTS

A domain wall displacement detection (DWDD) system magneto-optical recording medium and its manufacturing method according to an embodiment of the present invention will be described below with reference to the accompanying drawings. It is needless to say that the present invention is not limited to this embodiment.

Figure 3:
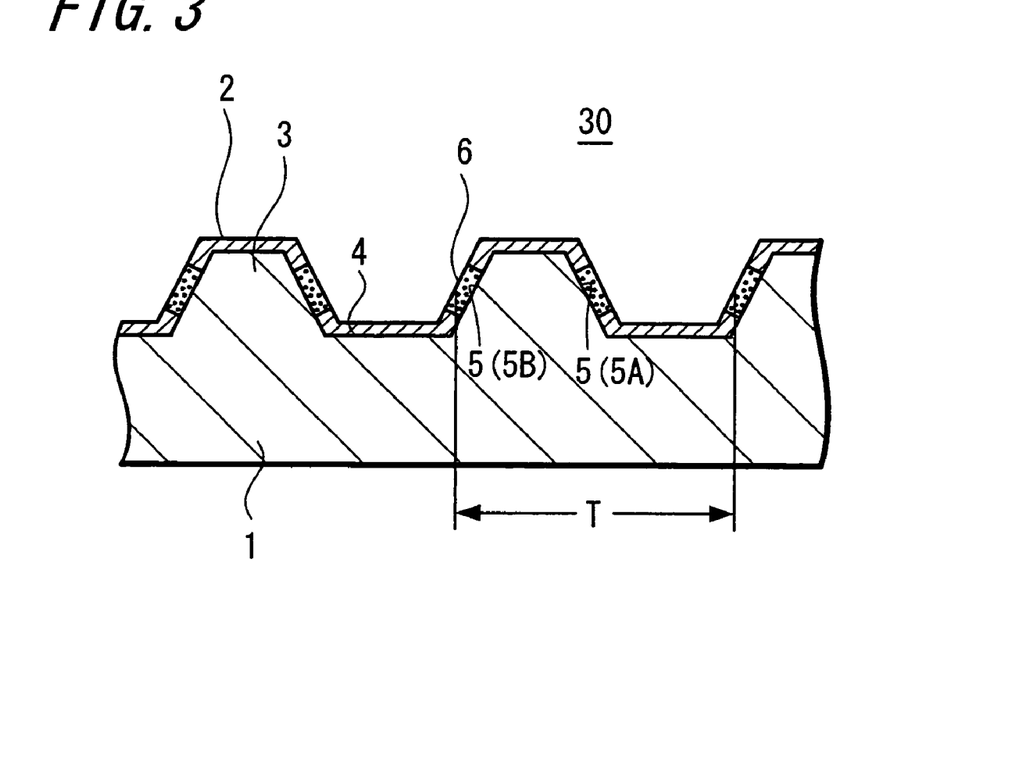
FIG. 3 is a schematic cross-sectional view showing an example of a magneto-optical recording medium according to the present invention.

FIG. 3 is a schematic cross-sectional view showing a main portion of a DWDD system magneto-optical recording medium according to an embodiment of the present invention. As shown in FIG. 3, a DWDD system magneto-optical recording medium according to the present invention includes a disc substrate 1 having an uneven surface formed on one major surface in which a land 3 is formed between a groove 4 and the adjacent groove 4 with a spiral pattern or a concentric pattern.

A pitch T between a concavity and a convexity can be selected to be 1.08 μm and a difference between the concavity and the convexity can be selected to be 55 nm, for example.

On the uneven surface of the disc substrate 1, there is formed a magneto-optical recording arrangement film 2 having at least a recording layer and a reproducing layer composed of magnetic layers formed along the uneven surface made by the land 3 and the groove 4.

In this magneto-optical recording arrangement film 2, a belt-like changed portion 6 in which the magneto-optical recording arrangement film 2 is changed as a non-magnetic film or an in-plane magnetization film is formed on a boundary wall surface 5 between the land 3 and the groove 4, for example, on boundary wall surfaces 5A and 5B at both sides of the land 3 along the recording track length direction.

Figure 4:
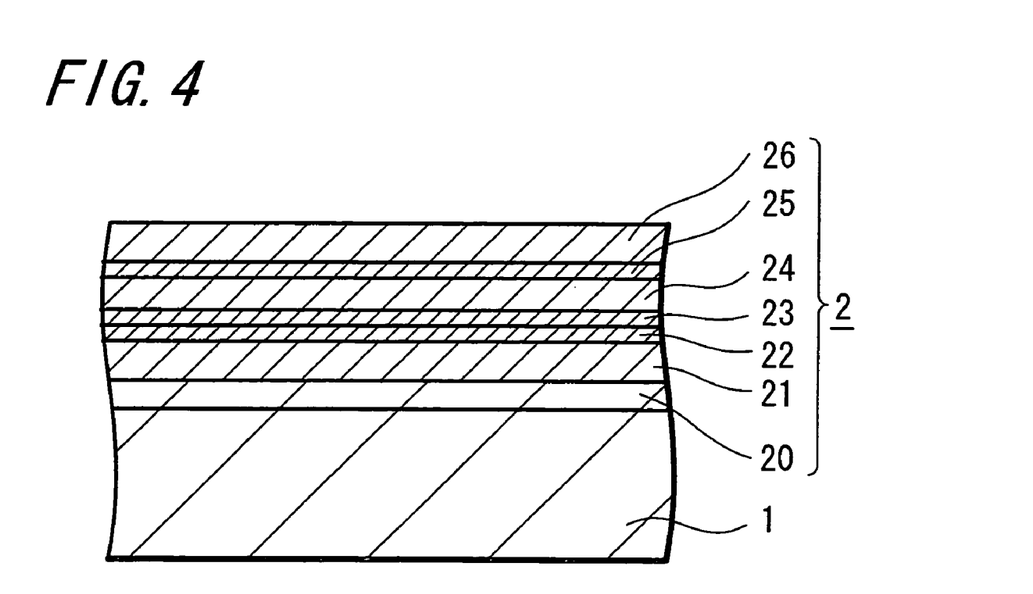
FIG. 4 is a schematic diagram showing an arrangement of a magneto-optical recording arrangement film in the example of the magneto-optical recording medium according to the present invention.

The magneto-optical recording arrangement film 2 can be formed as a well-known arrangement. FIG. 4 is a schematic diagram showing an arrangement of an example of the magneto-optical recording arrangement film 2, for example. As shown in FIG. 4, the magneto-optical recording medium arrangement film 2 has a substrate 1 on which there are laminated a dielectric layer 20 having a film thickness of 40 nm formed of an SiN layer, that is, a reproducing layer (displacement layer) 21 having a film thickness of 40 nm formed of a GdFeCo layer, a control layer 22 having a film thickness of 50 nm made of TbFeCo, an intermediate switching layer 23 having a film thickness of 15 nm made of TbFeCoAl, a recording layer 24 having a film thickness of 50 nm made of TbFeCo and a recording auxiliary layer 25 having a film thickness of 10 nm made of GdFeCo, in that order.

On this magneto-optical recording arrangement film 2, there is formed a protective layer 26 so as to fill the concavities and convexities on the surface of the magneto-optical recording arrangement film 2 although not shown.

In this magneto-optical recording medium, the recording layer 24 and the reproducing layer 21 are coupled to each other in a magnetic exchange coupling fashionThrough the control layer 22 and the intermediate switching layer 23 upon normal state, and recording marks recorded on the recording layer 24, that is, magnetic domains are transferred to the reproducing layer 21.

Then, upon reproduction, reproducing laser light is irradiated on the disc substrate 1 from the rear side, for example, to thereby carry out reproduction based upon DWDD, that is, the intermediate switching layer 23 at the portion in which recording marks (magnetic domains) to be reproduced is raised in temperature greater than Curie temperature with irradiation of reproducing laser light to thereby release the exchange-coupling between the reproducing layer 21 and the recording layer 24, whereby domain walls of the recording marks in the reproducing layer 21 are displaced along the recording track length direction by a temperature distribution within a beam spot of laser light to enlarge the recording marks to thereby obtain necessary and sufficient reproducing output due to rotation of plane of polarization of reproducing laser light owing to Kerr effect.

Figure 5:
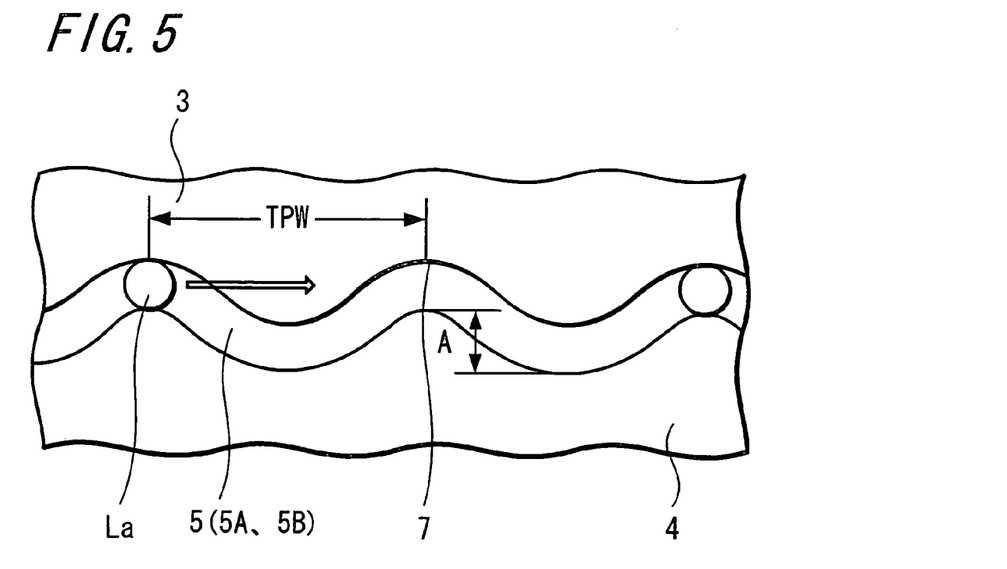
FIG. 5 is a plan view showing a wobbling portion of the example of the magneto-optical recording medium according to the present invention.

In the magneto-optical recording medium according to the present invention, a wobbling portion 7 with a waveform-like pattern wobbled in the width direction of the recording track is formed at one portion extending along the recording track length direction of the boundary wall surface 5 so as to detect the displacement of the annealing light scanning portion as shown in FIG. 5.

In this wobbling portion 7, its cycle Tpw can be selected to be 11 μm and its amplitude A can be selected to be 40 nm.

Figure 6:
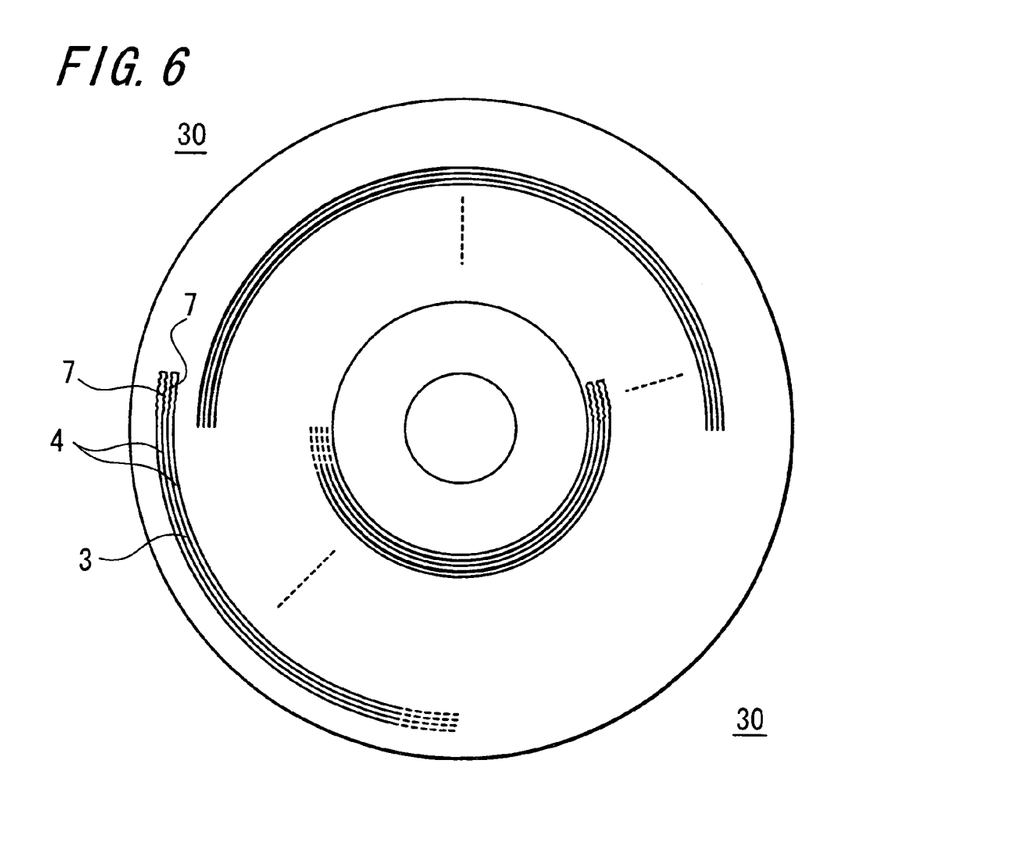
FIG. 6 is a plan view showing an example of the magneto-optical recording medium according to the present invention.

FIG. 6 is a schematic plan view of a magneto-optical recording medium 30. As shown in FIG. 6, this wobbling portion 7 is formed at the signal recording invalid area of the magneto-optical recording medium, for example, any of an outer end or an inner end of a spiral pattern or both ends of the spiral pattern limitedly.

A manufacturing method according to an embodiment of the present invention will be described.

According to the present invention, there is manufactured the substrate 1, for example, the disc substrate having the above-mentioned land 3, groove 4 and wobbling portion 7 with the waveform-like pattern wobbling in the track width direction of the recording track for detecting the displacement of the annealing light scanning position. In the manufacturing process of this disc substrate 1, at the same time the disc substrate 1 is molded by injection molding, the above-mentioned land 3, groove 4 and wobbling portion 7 are molded simultaneously.

Alternatively, the disc substrate 1 in which the above-mentioned land 3, groove 4 and wobbling portion 7 are formed is formed by a so-called 2P (Photopolymerization) method in which ultraviolet-curing resin photoresist layer is coated on the smooth surface of a plastic substrate or glass substrate and pressed by a stamper having a transfer pattern with an inverted uneven surface having the above-mentioned wobbling portion 7 to thereby form the above-mentioned land 3, groove 4 and wobbling portion 7.

Then, on the disc substrate 1, there are deposited the dielectric layer having the thickness of 40 nm formed of the SiN layer, the reproducing layer 21 having the thickness of 40 nm formed of the GdFeCo layer, the control layer 22 having the thickness of 5 nm made of TbFeCo, the intermediate switching layer 23 having the thickness of 15 nm made of TbFeCoAl, the recording layer 24 having the thickness of 50 nm made of TbFeCo and the recording auxiliary layer 25 having the thickness of 10 nm made of GdFeCo, in that order, by a suitable method such as a sputtering method.

After that, the magneto-optical recording arrangement film 2 on the boundary wall surface 5 between the land 3 and the groove 4 is annealed to form the above-mentioned changed portion 6.

Figure 7:
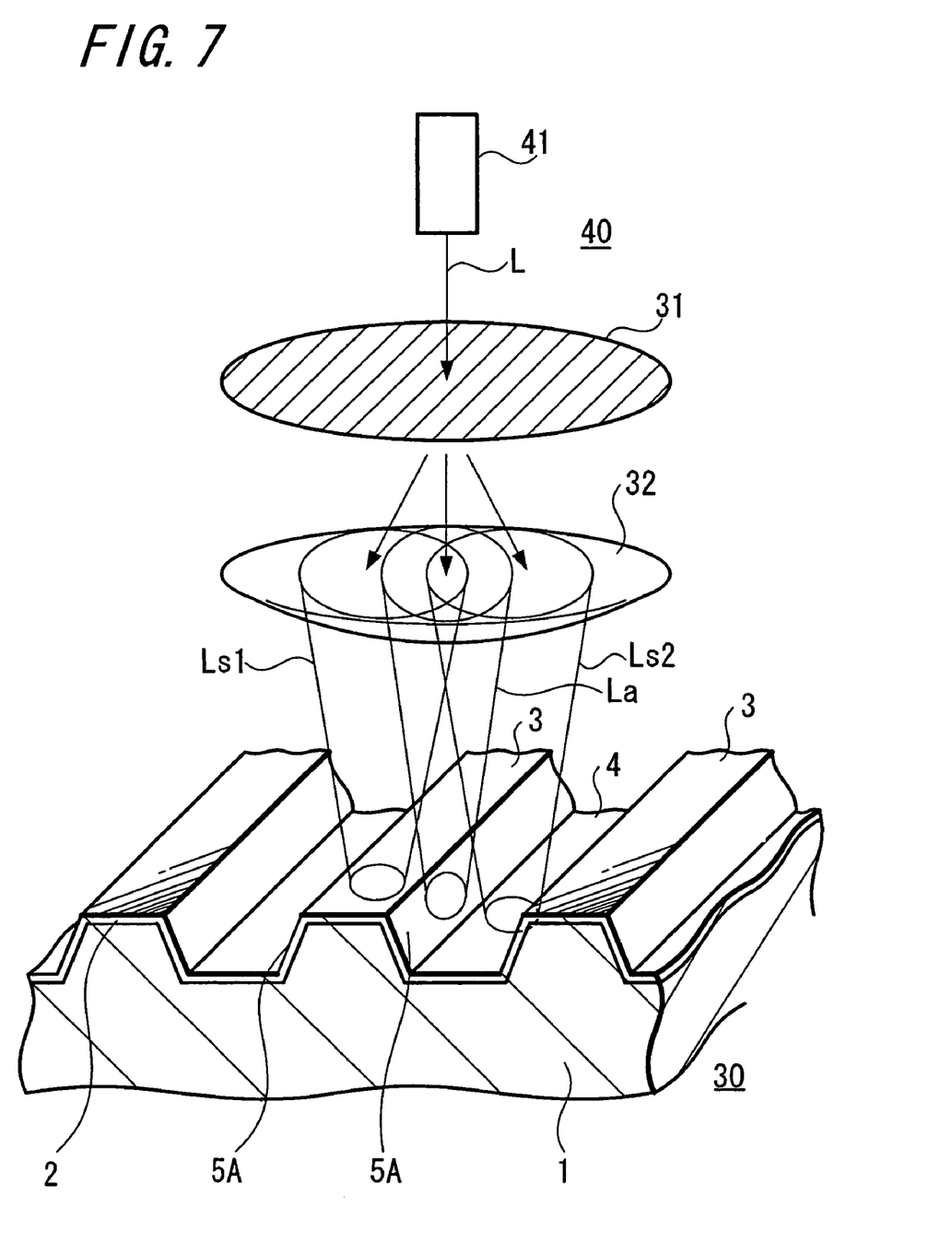
FIG. 7 is a schematic perspective view to which reference will be made in explaining laser annealing in a manufacturing method according to the present invention.

FIG. 7 is a schematic perspective view showing an example of a laser light irradiation optical system 40. In this annealing process, as shown in FIG. 7, single laser light L from a laser light source 41 with a wavelength of 405 nm is introduced into a grating 31 and thereby diffracted light is outputted to separate the laser light L into three beams of 0-th order light and ±first-order lights.

Then, while main laser light based on the 0-th order light with large power is used as the annealing light La and side lights Ls1 and Ls2 based upon the first-order lights are used as laser light to obtain a tracking servo signal, the annealing light La is scanned on the boundary wall surface 5 along the recording track length direction. In this laser light scanning operation, there is used a method in which the laser light La is scanned on one boundary wall surface 5a existing at both sides of the land 3, whereafter the laser light La is scanned on the other boundary wall surface 5B.

These laser lights La, Ls1, Ls2 are focused on the disc substrate 1 by an objective lens 32 with a numerical aperture (N. A.) of 0.85.

Then, by a method similar to a three-beam tracking servo system in the ordinary process, returned lights of these laser lights La, Ls1, Ls2 are controlled in such a manner that the annealing light La of the central beam may be irradiated on the predetermined boundary wall surface 5, for example, the boundary wall surface 5A of one side surface of the land 3 by controlling a drive mechanism for moving the optical system 40, for example, actuator (not shown).

More specifically, returned lights of the respective laser lights La, Ls1 and Ls2 from the magneto-optical recording medium 30 are respectively detected by two photodiodes (not shown), for example, and thereby push-pull signals MPP, SP1 and SP2 are obtained, respectively. Then, there is obtained a tracking error signal based on a difference signal (SP1−SP2) between the push-pulls signals SP1 and SP2, that is, DPP (Differential Push-Pull) signal.

Figure 8A:
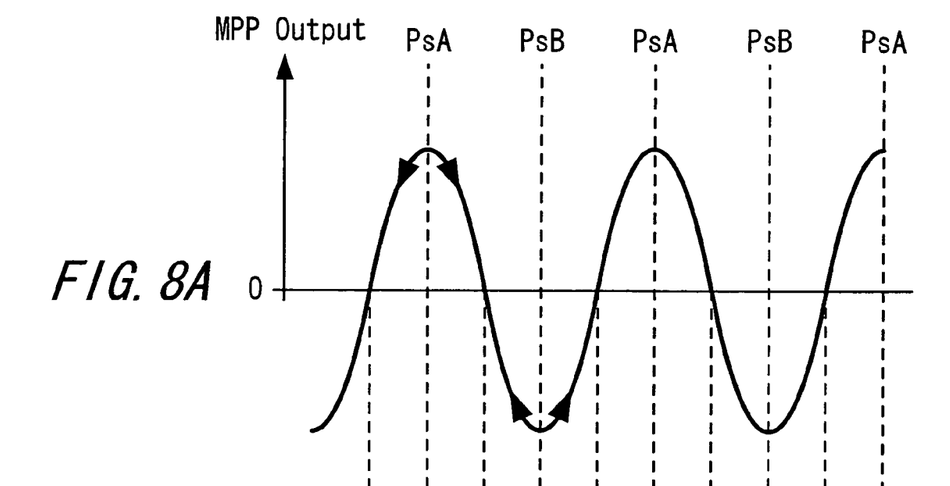
FIGS. 8A and 8B are diagrams of waveforms of a push-pull output (MPP) of center laser light in a three-beam servo system and a difference push-pull output (DPP) based upon side laser lights, respectively.
Figure 8B:
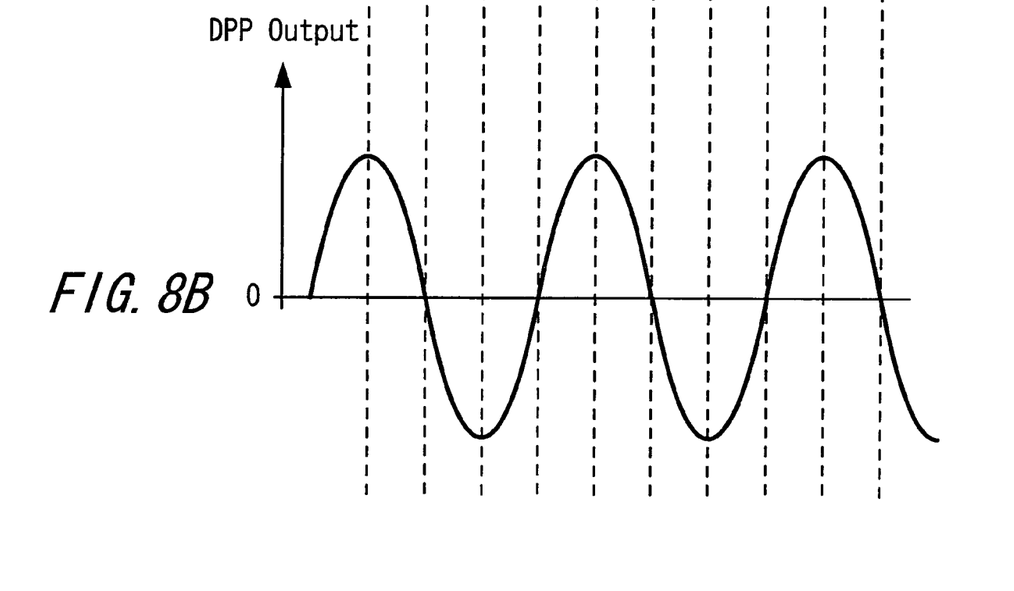

When the optimum position of the changed portion 6, for example, is located at the central position of the width direction of the boundary wall surface 5 (that is, direction extending along the recording track width direction), if the driving system of the optical system 40 is controlled by the tracking servo in such a manner that the optimum position of the annealing light La, for example, is brought to the central position of the width direction of the boundary wall surface 5, then a relationship between the MPP output and the irradiation position of the laser light (annealing light) La is illustrated in FIG. 8B, wherein maximum and minimum points are respectively obtained at the respective central positions PsA and PsB of the boundary wall surfaces 5A and 5B, for example. FIG. 8B shows a relationship between the DPP output and the irradiation position of the laser light (annealing light) La.

While the annealing optimum position of the annealing light La is set to the central position of the boundary wall surface 5 in the example shown in FIGS. 8A, 8b, if it is desired that the annealing light La is irradiated to form the changed portion 6 at the position deviated from the center of the boundary wall surface 5 to the side of the land 3 or the side of the groove 4 due to the shapes and characteristics of the land 3 and the groove 4, the maximum position and the minimum position can be arbitrarily selected at the deviated set positions by adjusting the MPP output from a circuit standpoint. However, in any cases, when the position of the annealing light La is detected at the target illumination set position by the MPP output, since the outputs indicative of the optimum positions become the maximum position and the minimum position, if the annealing light La is fluctuated from this set position toward the side of the land 3 or the side of the groove 4, a changed amount of the MPP output is small and its sensitivity is low.

Figure 9:
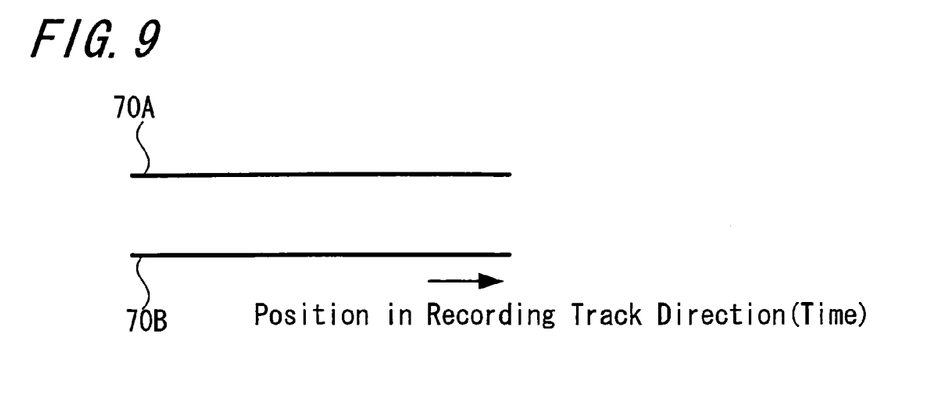
FIG. 9 is a diagram showing the MPP output obtained in the state wherein annealing light is irradiated at the predetermined set position.

For example, when the annealing light La is scanned in the state in which the annealing light La is set to one boundary wall surface 5A or the other boundary wall surface 5B sandwiching the land 3, for example, of the set position, as shown in FIG. 9, the MPP output is obtained as shown by a solid-line straight line 70A or a broken-line curve 70B.

Figure 10:
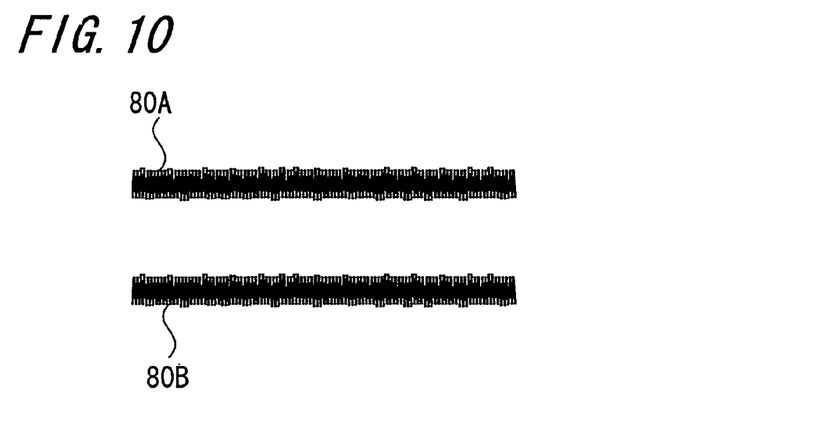
FIG. 10 is a diagram showing the MPP output obtained in the state wherein annealing light is displaced from the predetermined set position.

Assuming now that the annealing light La is fine displaced from the thus set scanning position to the side of the land 3 or the side of the groove 4, then the straight line 70A or 70B shown in FIG. 9 is fluctuated as shown by a curve 80A or 80B in FIG. 10. However, the MPP output is low in sensitivity as has been described with reference to FIGS. 8A, 8B, and hence the fluctuated amounts of the curves 80A and 80B are small.

Figure 11:
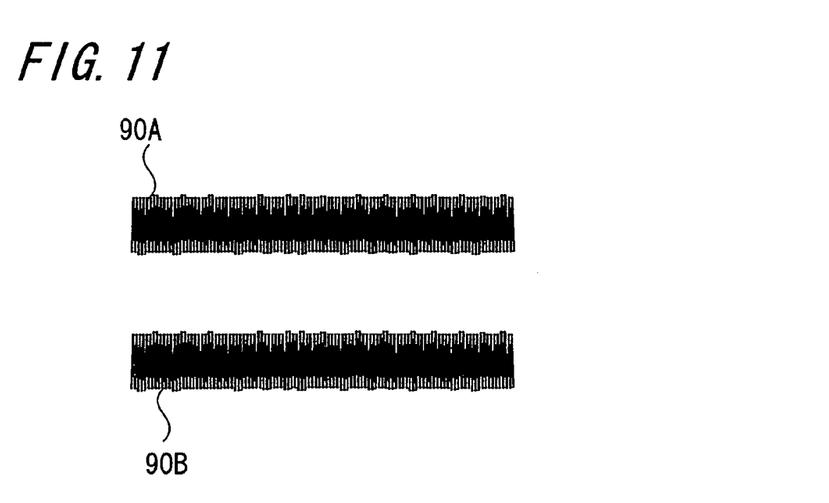
FIG. 11 is a diagram showing the MPP output obtained owing to effects achieved by an inventive wobbling portion in the state in which annealing light is displaced from the predetermined set position.

On the other hand, when the wobbling portion 7 is formed on the magneto-optical recording medium as shown in FIG. 5 so that the annealing light scans this wobbling portion 7 as shown by an arrow E, the annealing light La which is scanning the boundary domain wall position, for example, is fluctuated in the width direction of the boundary domain wall under servo control operation made by the side laser lights Ls1 and Ls2, which becomes equivalent to the fact that the laser light Ls substantially scans the land 3 or the groove 4. As a result, this becomes equivalent to the fact that the annealing optimum position is displaced to any one of the left and right directions from the central position PsA or PsB shown in FIG. 8A, that is, the annealing optimum position is displaced to the position at which the output characteristic becomes steep. Consequently, a very small fluctuation monitor signal shown in FIG. 10 can be obtained as a monitor signal of which amplitude is amplified as shown in FIG. 11. That is, it is possible to increase sensitivity at which the spot position of the annealing light is detected.

Then, when this wobbling portion 7 is located, if the wobbling portion 7 is limitedly formed at the starting end or the ending end of the recording track, for example, in the recording invalid area other than substantially the recording area, then it is possible to avoid the wobbling portion 7 from affecting recording of information. Once the position of the annealing light La is fine adjusted so that the DPP signal of the side lights Ls1 and Ls2, for example, is corrected, the annealing light La will be tracked to the optimum position under control based upon the three-beam scanning method.

As described above, according to the present invention, since the boundary domain wall position of the annealing light can be set accurately, the changed portions 6 are formed at the optimum positions with respect to the land 3 and the groove 4, and hence both of the land 3 and the groove 4 can be irradiated with annealing light of annealing power in which jitters and bit error rates may be minimized.

As described above, since the DWDD magneto-optical recording medium according to the present invention has the arrangement in which the wobbling portion is formed on the disc substrate, when the in-plane magnetization film or the non-magnetic changed portion, for example, is formed on the boundary wall surface of the land and the groove with respect to the magneto-optical recording arrangement film which enables the domain walls to be smoothly displaced in the recording areas of the land and the groove, the changed portion can be formed at the set position with high accuracy.

Furthermore, according to the manufacturing method of the present invention, when the disc substrate of the magneto-optical recording medium is produced, the changed portion can be formed at the optimum position highly accurately by the process in which the above-mentioned wobbling portion is formed and in which the in-plane magnetization film is formed by annealing the boundary wall surface between the land and the groove after the magneto-optical recording arrangement film has been formed on the disc substrate or by using the wobbling portion in the process in which the changed portion is formed by the non-magnetic film. That is, it becomes possible to set the common optimum annealing power so that the domain walls can smoothly be displaced in the respective signal recording areas of both of the land and the groove.

More specifically, according to the present invention, since the domain walls can smoothly be displaced in the recording tracks of both of the land and the groove and the jitter and the bit error rate can be decreased, the influence between the adjacent recording tracks can be decreased and hence the track pitch can be narrowed, whereby the recording density can be increased more.

Having described preferred embodiments of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A domain wall displacement detection system magneto-optical recording medium in which a magneto-optical recording arrangement film is formed on a disc substrate including a land and a groove, said land and groove are both formed as signal recording areas, a signal is recorded and reproduced based upon a domain wall displacement detection system and in which a boundary wall surface between said land and said groove is formed as a changed portion for improving domain wall displacement by irradiating the boundary wall surface between said land and said groove with annealing light along the recording track length direction, comprising:

a wobbling portion that is located in a signal recording invalid area other than a recording area of the magneto-optical recording medium, which wobbles in the width direction of said recording track for detecting a displacement of an annealing light scanning position formed at one portion along said recording track length direction of said boundary wall surface.

2. A domain wall displacement detection system magneto-optical recording medium according to claim 1, wherein said wobbling portion is formed on at least any one of both end portions of the recording track length direction in the signal recording invalid area of the magneto-optical recording medium.

3. A method of manufacturing a domain wall displacement detection system magneto-optical recording medium in which a magneto-optical recording arrangement film is formed on a disc substrate including a land and a groove, said land and groove are both formed as signal recording areas, a signal is recorded and reproduced based upon a domain wall displacement detection system and in which a boundary wall surface between said land and said groove is formed as a changed portion for improving domain wall displacement by irradiating the boundary wall surface between said land and said groove with annealing light along the recording track length direction, comprising the steps of:

preparing a disc substrate in which a wobbling portion that is located in a signal recording invalid area other than a recording area of the magneto-optical recording medium, which wobbles in the width direction of said recording track for detecting a displacement of an annealing light scanning position is formed at one portion along said recording track length direction of said boundary wall surface and on which said magneto-optical recording arrangement film is deposited;

an annealing light scanning and irradiating process in which annealing light is irradiated on the boundary wall surface of said land and said groove to change said magneto-optical recording arrangement film at said irradiated portion;

detecting the irradiated position of said annealing light by detecting returned light of said annealing light in said annealing light scanning and irradiating process; and causing a vibration amplitude of a cycle corresponding to a cycle of said wobbling portion to occur in said position detection signal by said wobbling portion.

4. A method of manufacturing a domain wall displacement detection system magneto-optical recording medium according to claim 3, wherein single laser light is separated into three beams, a central beam is used as said annealing light and a tracking servo signal of said annealing light is obtained by the other two beams.

5. A method of manufacturing a domain wall displacement detection system magneto-optical recording medium according to claim 3, wherein said wobbling portion is formed on at least any one of both end portions of the recording track length direction in the signal recording invalid area of the magneto-optical recording medium.

* * * * *